Aug. 31, 1948.  F. V. COWAN  2,448,173
HOLLOW ARTICLE AND METHOD OF MAKING SAME
Filed May 20, 1943
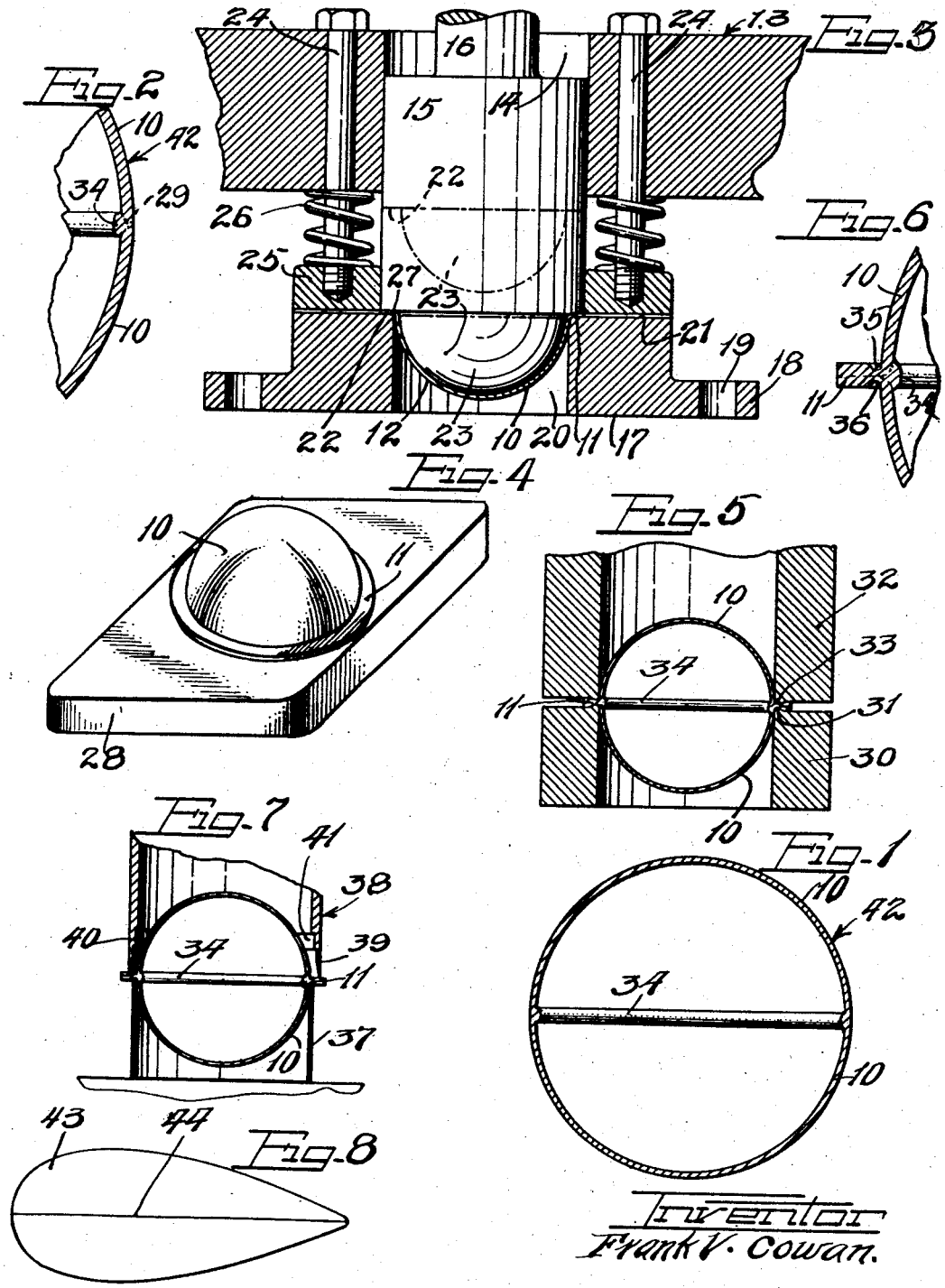
Inventor
Frank V. Cowan.
by Charles W. Hills Attys.

Patented Aug. 31, 1948

2,448,173

UNITED STATES PATENT OFFICE 2,448,173

HOLLOW ARTICLE AND METHOD OF MAKING SAME

Frank V. Cowan, Chicago, Ill.

Application May 20, 1943, Serial No. 487,827

6 Claims. (Cl. 154—16)

This invention relates to improvements in articles built up from a plurality of parts formed of relatively thin sheet stock and to an improved method of making the same.

It is an important object of my invention to provide an improved junction between parts of an article formed from relatively thin sheet material such as a synthetic plastic or the like.

While my invention may be embodied in a wide variety of articles, it is found to be of particular advantage in constructing hollow articles such as table tennis balls, or the like, where uniformity of balance and a smooth exterior surface, devoid of undulations is desired.

Accordingly, it is a further object of the invention to provide for a hollow article such as a table tennis ball which is built up from a plurality of segments formed of thin plastic stock, an improved uniform junction structure between the segments, this structure being disposed interiorly of the article and holding the segments securely together in substantial edge to edge relationship, thereby providing an evenly balanced article having an exterior surface which is smooth and devoid of undulations at the junction of the segments.

It is another object of the invention to provide, in a hollow article built up from a plurality of parts formed of thin sheet material, such as a synthetic plastic, a junction structure for the parts including an interiorly extending, reinforcing bead or fillet arranged to securely retain the adjacent parts in substantial edge to edge relationship.

It is a further object of the invention to provide an improved method for constructing an article of the above character.

In accordance with the general features of the invention, there is provided herein a method of manufacturing a hollow article from a plurality of parts constructed from thin synthetic plastic stock which includes the steps of forming outwardly disposed peripheral flanges at the edges of the parts which are to be joined, treating the surfaces of the flanges that are to abut each other to place the same in a softened or plastic condition, abutting said flange surfaces against one another to provide a united flange extending outwardly of the body of the article, applying uniform pressure to said abutting flanges to extrude or express the softened or plastic surface portions thereof inwardly to form a uniform, joining bead or fillet at the inner side of the junction of the parts, allowing the bead to harden and then removing the outwardly extending flanges and finishing the outer side of the junction between the parts.

It is a further object of the invention to provide an improved method of removing the outwardly extending flange from the article which includes the steps of progressively cutting the flange away from the outer edge thereof and then removing the last remaining portion thereof from the article with a shaving cut.

Still another object of the invention resides in applying a softening agent to the flanges of the sheet material parts to render the surfaces thereof sufficiently soft or plastic to flow under pressure, this being accomplished herein by disposing the respective flanges in surface engagement with an absorbent tab of felt or the like which has been saturated with a solvent, or a mixture of a solvent and a plasticizer.

Many other objects and advantages of my invention will become apparent from the following description and accompanying drawings in which:

Figure 1 is a diametrical cross-sectional view of a spherical hollow article, such as a ball, formed from relatively thin sheet material and embodying my invention;

Figure 2 is a fragmentary, enlarged view of a portion of Figure 1;

Figure 3 is a fragmentary, cross-sectional view, certain parts being shown in elevation, of a die assembly which may be used to form edge flanges on the parts of the article being constructed;

Figure 4 is a perspective view of the preferred apparatus used in treating the surfaces of the flanges on the parts of the article;

Figure 5 is a fragmentary, cross-sectional view of a preferred form of apparatus for compressing the outwardly extending flanges of an article being constructed;

Figure 6 is a fragmentary, enlarged cross-sectional view of a portion of the article shown in Figure 5;

Figure 7 is a fragmentary, cross-sectional view of a preferred form of apparatus for removing the outwardly extending flanges from the article being constructed; and Figure 8 is a side elevational view of a modified form of structure which embodies my invention and may be constructed in accordance with the method provided herein.

It will be understood that the embodiments disclosed herein are for illustrative purposes and may be changed or modified without departing from the spirit and scope of the invention as set forth in the appended claims.

As indicated previously, while the principles of my invention are disclosed and described herein in conjunction with a table tennis ball, it will be understood that my invention may be utilized and practiced in the manufacture of a wide variety of articles built up from a plurality of parts of relatively thin sheet material. As will be seen presently, however, the principles of my invention are particularly advantageous when embodied in a table tennis ball since, by my invention, the finished article is provided with an exterior surface devoid of undulations and is uniformly balanced throughout.

As is well known, it is customary to construct a table tennis ball from relatively thin, synthetic plastic stock by first forming hemispheres therefrom. Thereafter the edge of one of the hemispheres is urged into overlapping, telescoping relationship with the edge of the other hemisphere, there being a binder provided to retain the parts in this condition to make up a spherical finished article. With such a construction, difficulty has been encountered in maintaining the circular junction uniform with the result that the ball is out of balance thereby detracting from efficient performance thereof during play. The difficulties resulting from this lack of balance in the finished ball are particularly noticeable when the player strikes it to produce a spin. Under these circumstances an improperly balanced ball will traverse an indeterminate arcuate path.

It has also been found that the telescope relationship of the hemispheres formerly used in securing the same together presents a double thickness of the sheet material around the ball which results in an undulated section on the exterior surface thereof. This undulated section has been found to likewise detract from the efficiency of the ball during play in that when this undulated section of the ball strikes the hard surface of the playing table the expected direction of travel of the ball is changed.

In utilizing my invention for the construction of a hollow article formed from a plurality of parts of thin, synthetic sheet material such as a table tennis ball, I construct a pair of hemispheres having hemispherical crown portions 10 and an outwardly extending edge flange 11 as shown in Figure 4. These hemispheres are formed from a sheet of relatively thin, synthetic plastic stock 12 by any suitable apparatus, however, I prefer to use the construction of Figure 3 for this operation.

Figure 3 shows a die press including a guide member 13 which is supported for vertical movement in any suitable manner. The member 13 is provided with a circular aperture 14 in which a die plunger 15 having an operating shaft 16 is arranged to reciprocate, this die plunger 15 having a cylindrical outer wall conforming to the configuration of the wall of the aperture 14 to provide a sliding fit with the guide member 13. The die structure of Figure 3 also includes a lower die member 17 having laterally extending attachment flanges 18 provided with bolt apertures 19 for securing it to a suitable supporting surface, there being provided in the member 17 an aperture 20 of circular formation and of a diameter less than that of the aperture 14 of the guide member 13 and the die 15 which reciprocates therein, the members 13 and 17 being so arranged that the apertures 14 and 20 respectively are aligned concentrically.

The upper annular space 21 of the die member 17 is arranged to receive a sheet of thin, synthetic plastic stock 12 and is connected with the wall of the aperture 20 by a circular rounded edge 22 around which a portion of the stock may be drawn without breakage during a forming operation to be described presently.

There is provided at the lower surface of the die punch 15, a depending hemispherical forming member 23 having a shape and dimensions substantially like those of the crown portion 10 of the hemispheres being formed thereby. A plurality of supporting bolts 24 extend through suitable apertures in the guide member 13 and are disposed radially of the aperture 14 therein, these bolts having threaded lower ends arranged for threaded engagement with an annular stock holding ring 25 which is provided with a central aperture arranged to receive the cylindrical part of the die punch 15 in sliding relationship during the forming operation. A coil spring 26 is mounted upon each of the bolts 24 for compression between the lower surface of the member 13 and the upper surface of the annular stock holding ring 25. Thus, it will be seen that when the sheet stock 12 is disposed on the upper surface of the die member 17 and across the aperture 20 therein, downward movement of the guide member 13 will compress the springs 26 so that they will, in turn, urge the annular holding member 25 downwardly against the upper surface of the sheet stock 12 to provide a yielding, gripping action so that the stock may slide radially inwardly over the upper surface of the die 22 during the forming operation.

With the foregoing construction it will be seen that when the die punch 15 is withdrawn to the upper, dotted line position shown in Figure 3, the guide member 13 may be raised slightly whereupon, through bolts 24, the annular stock holding member 25 will also be raised upwardly away from the surface of the die member 17. Thereafter the sheet stock 12 is placed in the position shown in dotted lines across the upper surface of the die member 17 and the aperture 20 therein. The member 13, together with the bolts and the holding annulus 25, is then lowered so that the lower surface of the annulus yieldably retains the stock in sandwiched relationship with the upper surface of the die member 17. The press is then operated to lower the punch 15 whereupon the hemispherical depending portion 23 thereof engages the central part of the stock 12 to form the crown 10 into the aperture 20 of the die member 17 while the outer peripheral margin thereof is drawn radially inwardly from between the members 25 and 17. The downward movement of the punch 15 is continued until the shoulder 27 thereof which borders the depending portion 23 of the lower surface abuts the annulus of stock still overlying the upper surface of the die member 17 and which constitutes the flange 11 of the hemisphere. It will be understood of course that the step depth of the flange 11 which is not consumed in the pressing operation to form the crown is dependent upon the initial dimensions of the sheet stock 12 which, preferably, is in the form of a disk.

In the event that the sheet stock used is of such a nature that it is not susceptible to cold drawing and is rendered plastic by heating, it will be understood that a suitable heating arrangement can be associated with the apparatus shown in Figure 3 so that the stock will be in a somewhat plastic condition during the above described pressing operation.

The hemispheres having been formed in the manner above described, each is treated so that the surface thereof remote from the crown portion is provided with a plastic stratum which may later be subjected to an extrusion step. The manner in which this plastic stratum is formed and the material used to provide the same is of course variable according to the material from which the hemispheres have been formed. However in the present instance, it is contemplated that the hemispheres will be formed from a synthetic sheet stock such as a cellulose nitrate composition, "Celluloid," or the like, and that the stock will therefore be converted to a plastic, somewhat tacky condition, by application of a solvent such as acetone or other ketone, ethyl acetate or the like. The surfaces of the sheet stock so moistened retains this softened or plastic condition until the solvent has evaporated, whereupon the material reverts to its original, hard condition.

To the end that the evaporation of the solvent may be retarded and thus the reversion of the sheet material to its original condition be delayed, I contemplate the admixture of a plasticizer, such as di-butyl phthalate, tri-cresyl phosphate, tri-phenyl phosphate, or the like, to the solvent. This mixture may suitably be applied by means of an absorbent pad 28 of felt or the like as shown in Figure 4. As shown in that figure, the hemisphere is placed upon the pad with the crown 10 disposed upwardly so that the remote face of the flange 11 rests thereagainst. While the hemisphere is in this position, the solution with which the pad is saturated spreads by capillarity over the adjacent surface of the flange 11. Since the sheet stock used is from 0.019 to 0.020 inch thick, it is readily softened to provide a soft, tacky, plastic surface on the flange. In applying the solution to the flange it will be understood that the hemisphere may be merely rested upon the pad 28 or, if desired, pressure may be applied to accelerate the formation of the plastic stratum. Alternatively, the solution of the softening agent may be brushed or otherwise applied to the flange surfaces, or may be applied through a perforated screen.

As previously explained, the corner junction between the upper surface 21 of the die member 11 and the wall of the aperture 20 therein is rounded with the result that the hemispheres formed by the apparatus of Figure 3 will be provided with rounded corner junctions between the crown 10 and the flange 11 thereof. Thus when two of the hemispheres, treated with the above described solution, are placed with the treated surface of the flanges in face to face relationship, there will be provided, between the edges of the crown, an interior, circular groove as shown at 29 in Figure 2.

The hemispheres having been placed with the flanges 11 thereof in face to face relationship are then in readiness to be compressed together by the apparatus shown in Figure 5. This apparatus may include a lower cylindrical die member 30 having a circular rib 31 at the radially inner edge of the upper surface thereof and an upper reciprocable cylindrical die member 32 having a cooperating rib 33 at the radially inner edge of the lower surface thereof.

As shown in Figure 5 the internal dimension and configuration of the die members 30 and 32 are similar to those of the sphere formed by the crown 10 of the hemispheres, at the junction of the flanges 11 with the respective crown portion. Consequently, when the sphere, having the outwardly extending flanges 11, is rested upon the die member 30 with a crown 10 thereof depending into the interior of the die, the circular rib 31 is disposed around the sphere at the junction of the crown with the respective flange. The relationship of the bead 33 to the uppermost hemisphere, as shown in Figure 5, is similar to that of the rib 31. After the sphere has been positioned in the apparatus of Figure 5, the upper die 32 is moved downwardly whereupon the peaks 31 and 33 compress these flanges, thereby to extrude the softened, adjacent strata thereof into the interior of the sphere to provide an interiorly disposed bead 34 which, as will be seen from Figure 2, has filled the groove 29 disposed interiorly of the sphere. It will be understood that downward movement of die member 32 of the apparatus shown in Figure 5 will provide uniform pressure upon the flanges with the result that the fillet or bead 34 will be of uniform cross-sectional dimension throughout.

After the sphere has been pressed as above described, it may be removed from the apparatus of Figure 5 and stored for several hours to permit the solution which was applied by the pad 28 to evaporate, thus permitting the fillet or bead 34 to harden thereby to provide a strong, internal junction structure between the edges of the hemispheres.

At this stage of the process the article is in the condition shown in Figure 6. As will be seen from the drawing, the beads 33 and 30 have impressed grooves 35 and 36 respectively on the opposed faces of the flanges 11 and it is the displacement of the soft, tacky material from this compressing section which has formed the internal fillet 34. As the fillet 34 is extruded from between the flanges, it contains the unevaporated solvent which then reacts with the adjacent portion of the inner surface of the sphere to form a secure bond between the fillet and that portion of the surface.

The fillet 34 having been permitted to harden or set in the position shown in Figure 6, the sphere is then arranged in the apparatus shown in Figure 7. This apparatus includes a lower supporting cylinder 37 having a wall of thin stock, the upper edge of which is adapted to engage the radially inner portion of the outwardly extending flanges 11 of the sphere. A cylindrical trimming member 38 is arranged to reciprocate above the cylinder 37 and is provided with a lowermost, annular trimming blade 39 having a circular cutting edge prescribing a circle of such a size that depression of the member 38 cuts merely a narrow annulus from the outer edge of the outwardly extending flanges 11 of the sphere disposed on the cylinder 37. The member 38 is provided with a secondary cutting edge 40 which, as this member is further depressed, trims a second annulus from the remaining part of the flange 11, there being a third trimming edge 41 provided on the member 38 for finally trimming the flange with an extremely thin shaving cut.

After the above described trimming operation the sphere is placed in a closely fitting copper die where the junction of the edges of the hemispheres is further smoothed on the exterior side by heat and pressure.

Thereafter the sphere is removed from the die and placed in a tumbling barrel to give it a final lustrous finish.

As a result of the foregoing process, a sphere such as that shown in Figures 1 and 2 is obtained. It will be noted that the sphere 42 has a continuous external surface which is entirely devoid of undulations such as those presented at the exterior surface when the edges of the hemispheres are telescoped one into the other. As best shown in Figure 2, the edges of the crowns 10 of the hemispheres are disposed in substantial edge to edge relationship, this relationship being retained securely by the interiorly extending fillet or bead 34. Furthermore, since the bead is uniform in cross-section, the resulting sphere will be evenly balanced on all sides.

It will be understood that the cross-sectional dies of the fillet 34 may, if desired, be varied in accordance with the use to which the article in which it is incorporated is to be put. This variation in the size of the fillet may be accomplished first by varying the time during which the solvent is permitted to act upon the flanges of the sections of the article, whereby a thicker or thinner strata of tacky material is obtained. When the object to be formed is a tennis table ball made from sheet stock of 0.019 to 0.020 inch in thickness, the bead 34 may suitably be about twice that thickness, or 0.040 inch, and the width of the bead may be about 0.020 to 0.035 inch. Furthermore, the cross-sectional shape of the ribs 31 and 33 of the apparatus shown in Figure 5 may be varied so that a greater or smaller surface area of the opposed flanges may be pressed to cause more or less of the tacky surface material therefrom to be expressed from between the die ribs to form the bead 34.

In Figure 8 there is disclosed a hollow article having an external surface different from that of the sphere 42. The article 43 there shown is of substantial tear drop formation and is formed in two sections having a substantial edge to edge junction along the line 44. It will be understood that such an article may be formed in the manner previously described, it being necessary to merely provide apparatus such as that shown in Figures 3, 5 and 7, in which the shape of the cooperating members is such as to conform to the configuration of the article being constructed.

From the foregoing it will be seen that I have provided an improved article of manufacture which is built up from a plurality of sections of thin sheet material such as a synthetic plastic or the like, adjacent parts of the article being securely retained in substantial edge to edge engagement by an internal, reinforcing fillet or bead, the external surface of the article being continuous and devoid of irregularities and undulations particularly at the edge to edge junction of the various adjacent parts thereof. Furthermore I have provided an improved method of making the same.

What I claim is:

1. In a method of forming a hollow article from a plurality of parts constructed from a thin plasticizable sheet material, the steps of forming outwardly disposed flanges along the edges of said parts, treating a surface of said flanges with a solvent to soften the same, placing the parts together to form the article with the surfaces so treated in face to face engagement, pressing the flanges together to express softened portions thereof inwardly into the article to form a junction structure on the interior thereof, and removing the outwardly extending flanges to provide a smooth exterior surface for the article devoid of undulations.

2. The method of forming a hollow article from a plurality of parts constructed from a thin sheet of a synthetic plastic, the steps of forming outwardly extending flanges at the edges of said parts, treating a surface of said flanges with a solution including a solvent for the plastic and a plasticizer therefor, placing the surfaces so treated in face to face engagement to generally form the article, compressing the flanges to displace softened portions of the treated surfaces thereof inwardly of the article to form an interior junction structure, permitting the solvent to evaporate from the material constituting the junction, and removing the exteriorly extending flanges to provide for the article a smooth outer surface devoid of undulations.

3. In a method of constructing a hollow article from a plurality of parts formed from thin sheet of a synthetic plastic of the cellulose nitrate type, the steps of forming outwardly extending flanges at the edges of said parts which are to be secured together to form the article, applying a solution comprising a mixture of a solvent for the plastic and a plasticizer therefor to a surface of each of said flanges to soften said surfaces, disposing the softened surfaces in face to face relationship, applying uniform pressure to the flanges so disposed to express the softened strata thereof inwardly of the article thereby to provide an inwardly extending, integral junction fillet, allowing the solvent to evaporate from the inwardly expressed material and removing the outwardly extending flanges to provide for the article a smooth exterior surface devoid of undulations.

4. In a method of making a hollow article from a plurality of parts each formed from a thin sheet of synthetic plastic material, the steps of forming outwardly extending edge flanges on each of the parts, treating the surfaces of said flanges with a solvent to soften exterior strata thereof, disposing the surfaces so treated in face to face relationship to form the article, uniformly compressing the flanges so disposed to extrude a uniform fillet on the interior surface of the article and disposed across the junctions of said parts, and trimming the outwardly extending flanges from the outer surface of the article by progressively cutting away portions thereof from the outer edge.

5. The method of forming an article from a plurality of parts constructed from thin synthetic plastic sheet material which comprises the steps of forming outwardly extending flanges at the edges of the parts to be secured together, disposing surfaces of said flanges in contact with a solvent to provide a soft, plastic stratum on each of said surfaces, disposing the surfaces of the flanges so treated in face to face relationship to form the article, applying pressure to the flanges so disposed to extrude the softened material inwardly of the article to form a uniform bridging portion of the material across the marginal portions of the adjacent parts, evaporating the solvent from the extruded material and removing the outwardly extending flange from the article to afford a smooth exterior surface devoid of undulations.

6. In the method of making table tennis balls from thermo-plastic material, the steps of forming ball halves each provided with a radially extending circumferential flange, softening the adjacent surfaces of the flanges only with sufficient solvent to enable the material of said surfaces to be displaced under pressure and placing said surfaces in contact, subjecting the flanges only of the ball halves to pressure by pressure means which confines said pressure solely to the flanges without contacting with or imposing pressure on any other parts of the ball halves, whereby the solvent-softened contacting faces of the flanges are the only parts of the ball halves affected by said pressure, said pressure forcing the solvent-softened portions of the flanges inwardly and into the interior of the ball halves to build up and extend over and coat the joint between the ball halves.

FRANK V. COWAN.

REFERENCES CITED

The following references are of record in the file of this patent:

UNITED STATES PATENTS

| Number | Name | Date |
|---|---|---|
| 73,708 | Flagg | June 28, 1868 |
| 662,961 | Petit | Dec. 4, 1900 |
| 716,645 | Ramson | Dec. 23, 1902 |
| 1,163,987 | Eggers | Dec. 14, 1915 |
| 1,400,146 | Eggers et al. | Dec. 13, 1921 |
| 1,436,028 | Flemming | Nov. 21, 1922 |
| 1,531,505 | Roberts | Mar. 31, 1925 |
| 1,807,239 | Guentzler | May 26, 1931 |
| 1,824,690 | Schneider | Sept. 22, 1931 |
| 1,921,623 | Leguillon | Aug. 8, 1933 |
| 2,025,455 | Jaques | Dec. 24, 1935 |
| 2,253,291 | Fraknoi | Aug. 19, 1941 |
| 2,378,034 | Perryman | June 12, 1945 |

FOREIGN PATENTS

| Number | Country | Date |
|---|---|---|
| 6,940 | Great Britain | May 5, 1890 |